(Model.) 5 Sheets—Sheet 1.
E. A. JONES.
MACHINE FOR MAKING SPIRAL SPRINGS.
No. 317,543. Patented May 12, 1885.

(Model.)

E. A. JONES.
MACHINE FOR MAKING SPIRAL SPRINGS.

No. 317,543. Patented May 12, 1885.

5 Sheets—Sheet 2.

WITNESSES
INVENTOR
Edgar A. Jones (Model.)

E. A. JONES.
MACHINE FOR MAKING SPIRAL SPRINGS.

No. 317,543. Patented May 12, 1885.

5 Sheets—Sheet 3.

WITNESSES
Wm. T. Gill
Albert Popkins

Edgar A. Jones INVENTOR
By H. A. Seymour ATTORNEY (Model.) 5 Sheets—Sheet 5.

E. A. JONES.
MACHINE FOR MAKING SPIRAL SPRINGS.

No. 317,543. Patented May 12, 1885.

WITNESSES
Wm. T. Gill.
Albert Popkins.

INVENTOR
Edgar A. Jones
By H. A. Seymour
ATTORNEY

United States Patent Office.

EDGAR A. JONES, OF THREE RIVERS, MICHIGAN.

MACHINE FOR MAKING SPIRAL SPRINGS.

SPECIFICATION forming part of Letters Patent No. 317,543, dated May 12, 1885.

Application filed July 21, 1884. (Model.)

*To all whom it may concern:*

Be it known that I, EDGAR A. JONES, of Three Rivers, in the county of St. Joseph and State of Michigan, have invented certain new and useful Improvements in Machines for Making Spiral Springs; and I do hereby declare the following to be a full, clear, and exact description of the invention, such as will enable others skilled in the art to which it appertains to make and use the same.

My invention relates to an improvement in machines for making bed-springs, and more especially adapted for making such as shown and described in Patent No. 276,421, granted to me April 24, 1883, the object being to provide a machine by means of which springs may be readily and easily formed, and which shall be simple and economical in construction, and at the same time durable and efficient in use.

With these ends in view my invention consists in certain novel features of construction and combination of parts, as will be hereinafter described, and pointed out in the claims.

Figure 1:
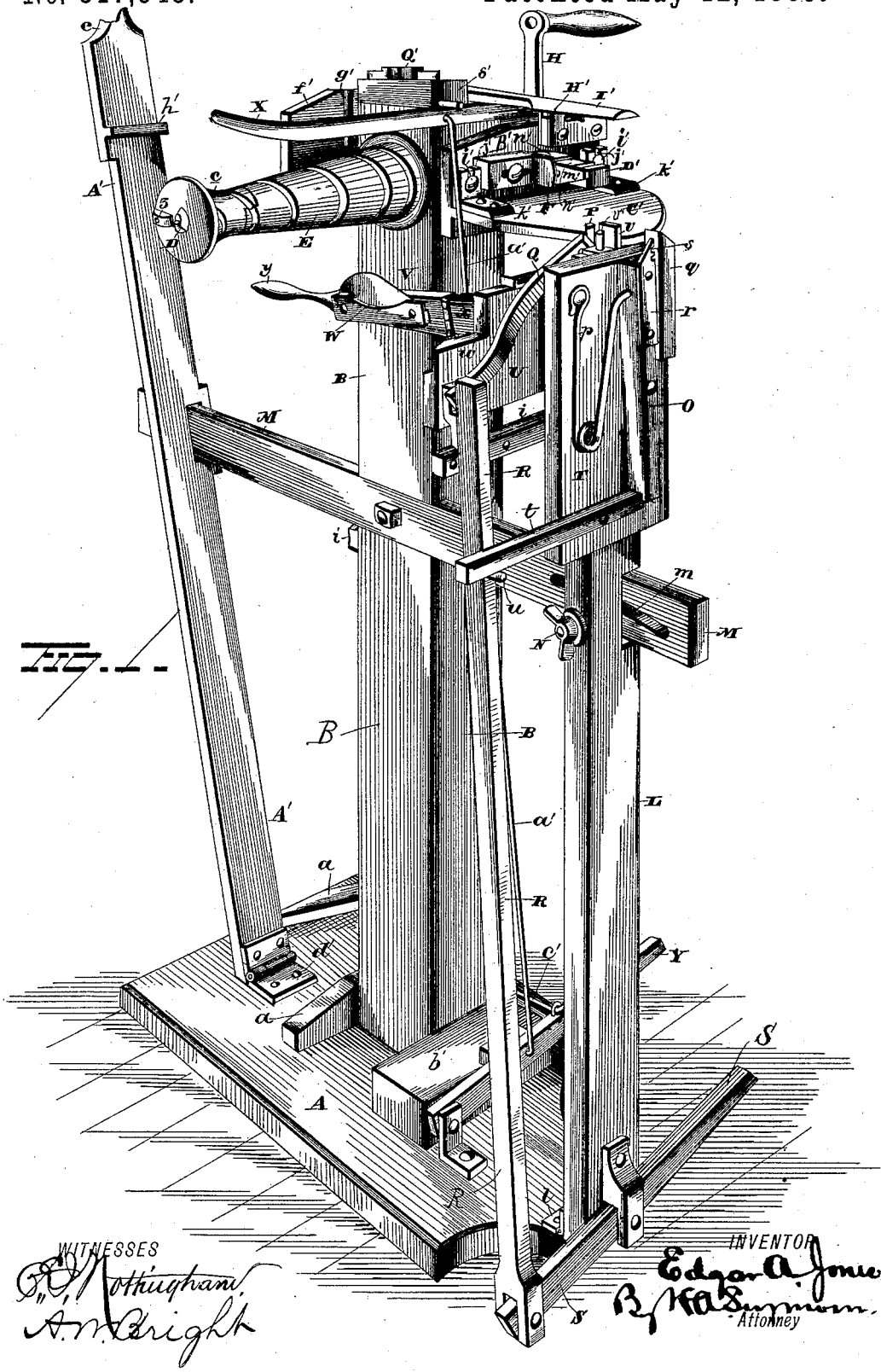
Figure 2:
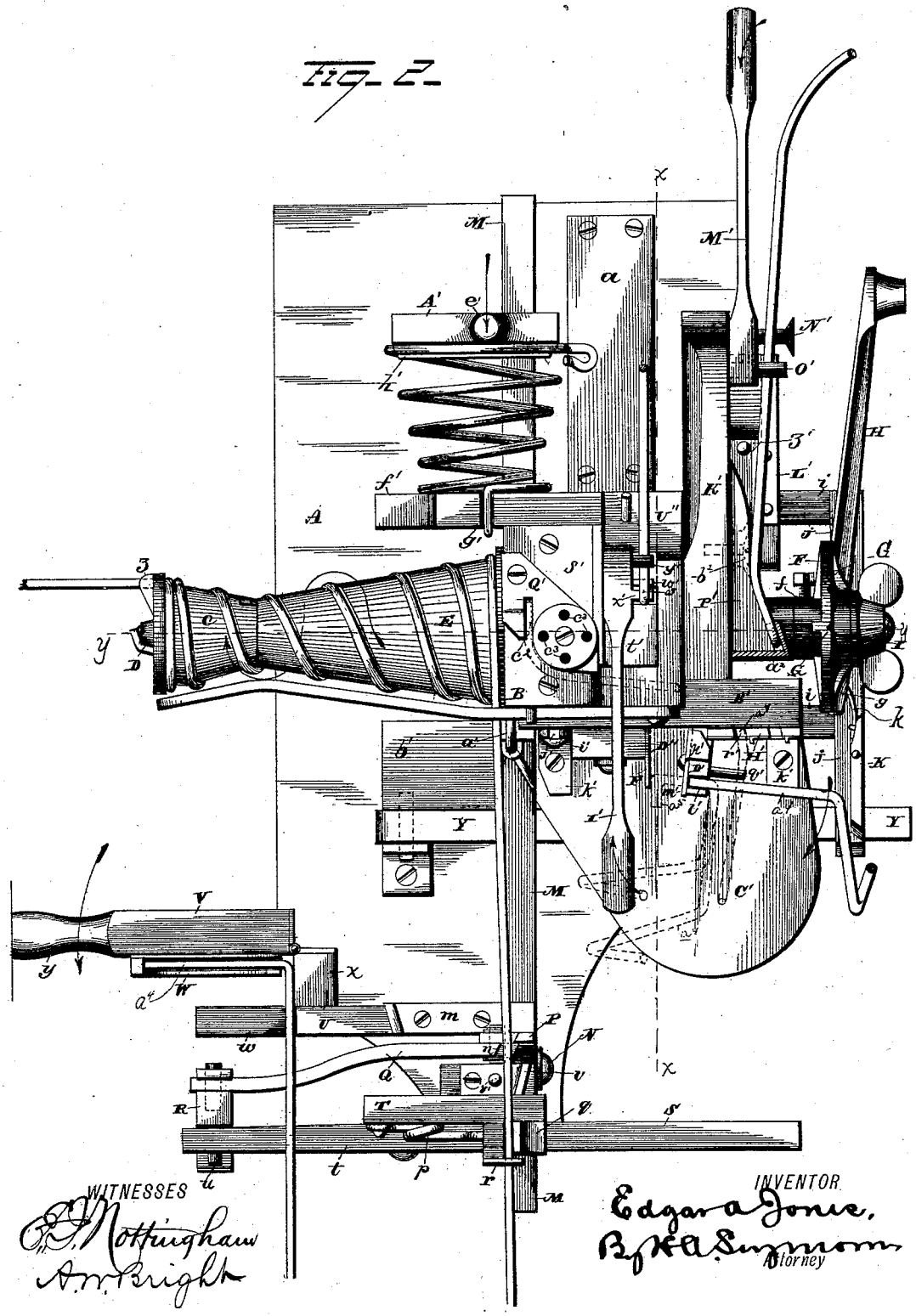
Figure 3:
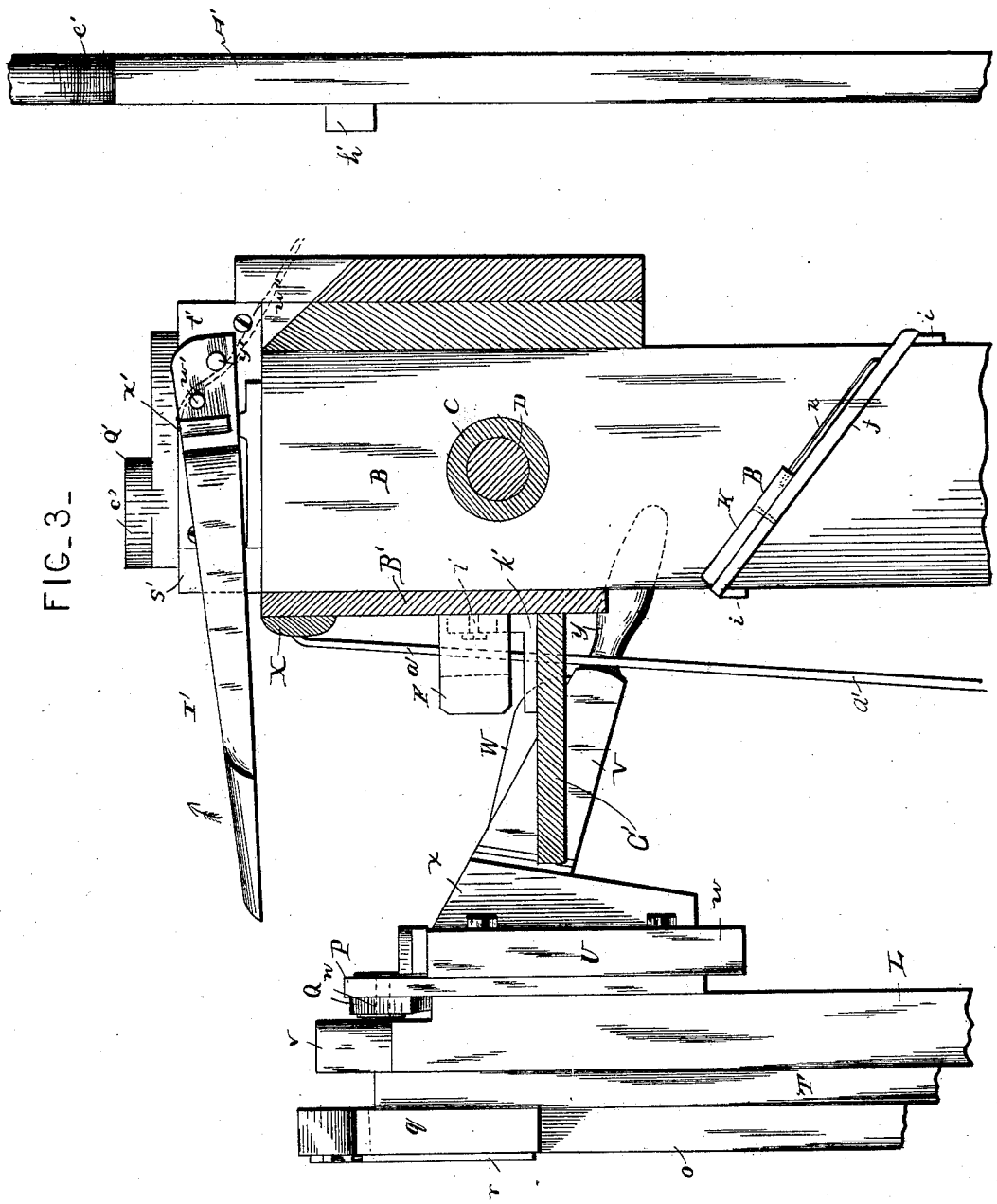
Figure 4:
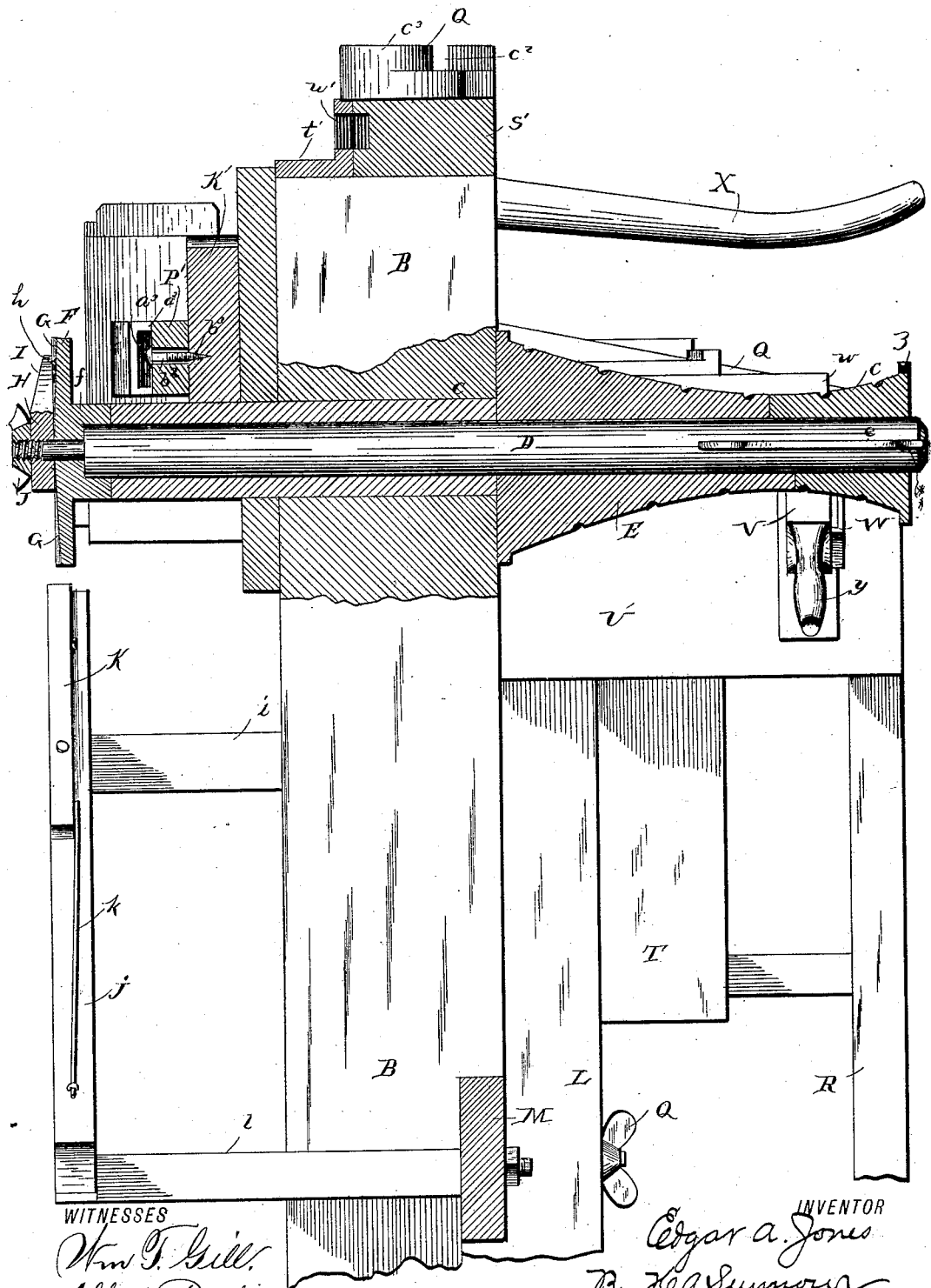
Figure 5:
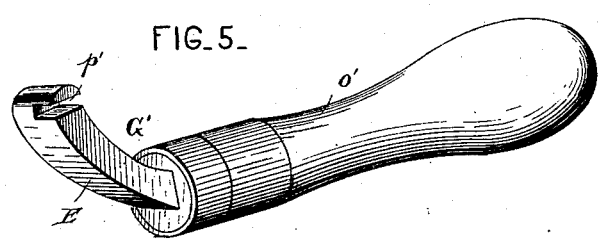
Figure 6:
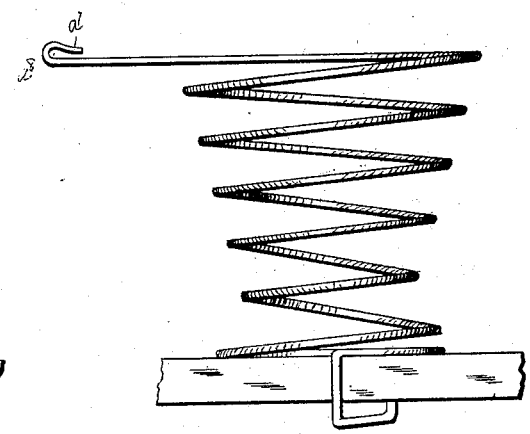
Figure 7:
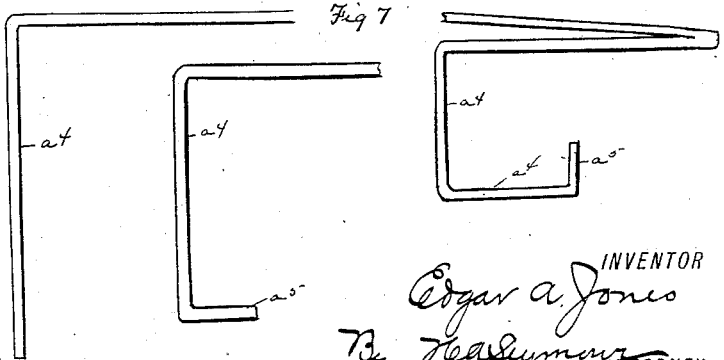

In the accompanying drawings, Figure 1 is a view in perspective of my improved machine. Fig. 2 is a top plan view thereof. Fig. 3 is a sectional view of the upper portion of my machine, taken on the line $x^1 x$ of Fig. 2. Fig. 4 is a sectional view taken on the line $y y$ of Fig. 2. Fig. 5 is a view of a bending-tool. Fig. 6 is a view of the different forms of springs; and Fig. 7 is a view showing the lower end of the spring as it appears at different stages in construction.

A represents a base made of any suitable size and material adapted to be screwed to the floor or other convenient place, and to which is secured the upright post or standard B, the latter being securely held in position by braces $a$.

Through the standard B, near the top thereof, is passed a sleeve-bearing, C, in which is fitted a horizontal shaft, D, on one end of which is secured an ordinary winder, E, adapted to form a double cone-spring, the outer end, $c$, of which winder is made separate from the inner portion and allowed to be slipped on and off the shaft D, which latter is provided with a groove, in which is inserted a spring, $e$, the end of which latter extends out beyond the piece $c$, and is so bent as to prevent said piece from becoming too easily detached from the shaft D.

On the shaft, and near its opposite end, is fitted a disk, F, provided with a collar, $f$, embracing the shaft and tightly secured thereto, the outer face of the disk F being provided with radial grooves or indentations G.

To the end of the shaft is secured the lever or handle H, by means of which the winder is turned, the end $g$ of the lever H preferably extending near the outer edge of the disk F. On the lever H is also formed a small arm, I, extending out at right angles with the lever H, and is provided on its inner face with a rib or projection, $h$, adapted to fit in one end of the grooves G in the disk F, a similar projection being formed on the end $g$, also adapted to fit in one of said grooves, the said lever being held in position on the shaft and against the disk F by means of a thumb-nut, J, screwed on the outer end of said shaft. By this arrangement the lever can be fastened to the disk at any point in its travel, and thus allows the lever to be stopped at a certain point after having wound up a certain amount of wire, and also to allow for the temper and uncoiling properties of the different wires used.

To opposite sides of the standard B are secured the horizontal pieces $i$, one somewhat higher than the other, and having their outer ends connected by the inclined piece $j$, the upper end of which extends beyond the higher of the pieces $i$, the latter being of such length that the handle when turned will just clear the piece $j$.

On the upper portion of the inclined piece $j$ is pivotally secured the rest K, to the lower end of which is secured one end of a spring, $k$, the opposite end of the latter being secured to the incline $j$, and having a tendency to keep the outer edges of the rest and piece $j$ in a straight line. After the wire has been coiled around the winder the upper end of the rest is pulled outward and the handle allowed to rest against it, and thus prevent the winder from revolving backward and uncoiling the spring. When the handle is raised, the spring $k$ forces the lower end of the rest outward and the upper end inward, and thus allows the handle to be turned back to loosen the coil from the winder.

To the platform or base A, and a short distance from the lower end of the standard B, is secured preferably by a hinge, $l$, the lower end of a standard, L, which is somewhat shorter than the standard B, and is secured to a horizontal piece, M, secured to the standard B about midway its length, the said piece M being provided with an elongated slot, $m$, through which passes a bolt provided on one end with a head, N, which bears against the piece M, the other end passing through the standard L, and being provided with a thumb-nut, O, by means of which the standard may be held tightly against the beam M. It will thus be seen that by this arrangement of parts the standard L may be moved either toward or away from the standard B and be retained in any desired adjustment.

To the inner face of the standard L is rigidly secured the metal piece P, a portion of its upper end being cut away, and having one edge beveled to form a stationary cutting-jaw.

To the piece P, below the cutaway portion, is pivotally secured a knife, Q, one end of which is beveled and forms a cutting-edge, $n$, the opposite end of the knife being connected by a pitman, R, to one end of a lever, S, which is pivoted to the lower portion of the standard L. By pressing down on the free end of the lever S the pitman R will raise the outer end of the knife Q, and thus bring the two cutting-edges together, and when the foot is taken from the lever the outer end of the knife Q will fall and open the cutting-jaws.

To the outer face of the standard L is secured the wooden piece T, extending from the top of the standard nearly to the piece M, and is somewhat wider than the standard. To this piece T is pivotally secured the movable jaw $o$ of the wire-clamp, against the upper end of which bears one end of a spring, $p$, the other end of said spring being secured to the wooden piece T. The tendency of the spring is to keep the upper end or jaw, $r$, of the clamp $o$ against a stop or rigid jaw, $q$, fastened to the piece T and extending above the same. The metal plate $r$ of the movable jaw extends above the strip $o$ and has its upper end provided with depressions $s$. This metal piece, in connection with the stop $q$, forms jaws for grasping the wire before it is severed by the cutter, and is operated as follows: The lower end of the clamp $o$ is pushed out, thus forcing the upper plate, $r$, away from the stop $q$, the clamp being held in that position by means of a trigger, $t$, pivoted to the piece T, and having one end extending over to the pitman R, which latter is provided with a stop, $u$, on which the ends of the trigger $t$ rests. When the lower end of the clamp is pulled out or away from the trigger, the heavy end of the piece $t$ drops onto the stop $u$, and the lighter end of said trigger $t$ rises and rests against the adjacent face of the clamp, and consequently holds the movable jaw $r$ of the clamp open or away from the rigid jaw $q$. Near one side of the machine is placed a reel of any desired construction adapted to carry the wire. From this reel the wire passes to the winder, and after being coiled is then dropped into the cutting-jaws and clamp. As before described, when the free end of lever S is depressed, the cutting-jaws are closed and thus sever the wire. As the pitman R is raised in this operation, and before the cutting-jaws are closed, the stop or rest $u$ secured to said pitman raises the longer arm of the trigger $t$ and lowers the short arm out of contact with the clamp $o$, whereupon the spring $p$ forces the upper end of the clamp $o$ against the stop $q$, the metal plate $r$ striking the wire and holding it tightly against the stop $q$, thus preventing the wire from flying around or back to the reel out of the operator's reach.

To the top of the standard L is secured a bent metal piece, $v$, provided with a pin or projection, $v'$, between which the wire rests, and which assists in holding the wire in position between the cutting and holding jaws.

To the inner face of the standard L is secured a horizontal wooden piece, U, the upper outer corner of which is cut away and forms a shoulder, $w$. To the inner side of the piece U and in line with the shoulder is secured the block $x$, the outer face of which is beveled, as shown in Fig. 3, and to which is secured, preferably by a hinge, a lever, V, provided with a handle, $y$, which lever, owing to the shape of the block $x$, will be on a slant, the object being to locate the end of the handle below and out of the way of the winder.

On the outer face of the lever V is secured a metal box, W, the rear plate of which extends up beyond the top of the lever, said box being adapted to receive the end of the wire.

At the commencement of the operation one end of the wire is placed in the box and the lever is pulled around toward the piece U as the wire bears against the shoulder $w$. The end of the iron is thus bent around at about right angles, as shown in Figs. 2 and 7, the rear plate of the said box preventing the wire from slipping out of the box over the lever. The end of the wire after being bent in this manner is inserted from the inner face of the enlarged end of the winder through a hole, $z$, formed in the end of the winder and the handle of the latter turned, the wire being guided in the groove formed in said winder. After the wire has been coiled the wire is cut, as before described, the length of the end or uncoiled portion being determined by the distance of the standard L from the standard B.

To assist in guiding the wire in the groove in the winder and in giving the various tensions thereto, I pivotally secure to the side of the post B and near the top thereof one end of a metal bar, X, the outer end of which is slightly curved to conform to the shape of the winder. To bar X is connected by means of a pitman, $a'$, a lever, Y, one end of which latter is pivoted to a block, $b'$, secured to the base A and standard B, a spring, $c'$, being secured to the base A and lever Y for the purpose of keeping the latter, pitman $a'$, and rod X in an elevated position. It will be readily seen that when the wire is being coiled around the winder different tensions may be applied thereto by pressing down on the lever Y, the bar X also assisting in guiding the wire in the groove formed in the winder.

To the base or platform A, and on the opposite side of post B from the standard L, is secured, preferably by a hinge, $d'$, a lever, A′, the upper end of which is formed into a handle, $e'$, and extends a short distance above the post B. To this post B, and on the same side thereof as the lever A′, is secured a wooden piece, $f'$, extending beyond the side of the post B, and provided with a vertical elongated slot, $g'$, into which is placed the short end of the spring after it has been taken from the winder, the large coil thereof being placed against the inner face of the lever A′, which latter is provided with a transverse strip, $h'$, to keep the spring in position. The lever is now pulled toward the post B, thereby compressing the spring into proper shape.

To the side of the post B is secured the horizontal wooden piece B′, extending out beyond the post, and to which is secured the table C′ by means of screws $i'$ passing through slots $j'$, formed in the brackets $k'$, secured to the table, the said slots $j'$ being elongated for the purpose of allowing the table to be vertically adjusted.

From the wooden portion B′ extends the metal piece D′, provided near its outer end with a transverse groove, $l'$, one end of which is normally closed by means of a stop, $m'$, pivoted to the side of the metal piece D′, one end, $n'$, of which stop is bent over and adapted to fit or rest on the top of the piece D′.

After the spring has been removed from the compressor-lever the straight end of the smaller end of said spring is placed in the groove $l'$, as shown at $a^4$, Fig. 2, and bent around at about right angles, forming the bend shown at $a^5$. The bending is preferably done by means of the device G′, (shown in Fig. 5 of the drawings,) consisting of the curved metal bar E′, provided at one end with a handle, $o'$, and near the other end with a transverse groove, $p'$, adapted to receive the wire. This device is placed over the wire, which latter fits in the groove $p'$, the metal bar E′ striking the stop $q'$ projecting from the piece D′ for that purpose, and the tool G′ is then forced around, carrying the spring around with it, and bending the wire at right angles. The handle or tool is then taken off and the wire taken out of the groove $l'$ and again placed in said latter groove with the bent end $a^5$ of the wire striking the stop F′, secured to the piece D″, and the wire again bent around, as shown in Fig. 7, by means of the tool G′, until the upwardly-bent end of the wire is exactly in the center of the lower coil of the spring, the stop $m'$ being pushed down by the wire to allow the latter to be inserted in the groove $l'$. This operation completes the lower end of the spring, as shown in Fig. 2 of the drawings.

To the piece B′ is secured the flat steel block H′, provided on its upper edge with the recesses $r'$, varying in size to receive different-sized wires. Into one of these slots or recesses is inserted the end of the long arm of the wire, which latter is then pushed around a short distance, forming a slight bend, as shown at $a^7$, Figs. 2 and 6, in the end of the wire.

To the top of the standard B is secured a block, $s'$, to one side of which is secured a bracket, $t'$, the lower portion of which is secured to the upper end of the post B, a portion of the upper end of said latter post being cut away, as shown at $u''$, Fig. 3. On the bracket $t'$ is formed a pivot-pin, $y'$, on which is adapted to turn the lever I′, provided with the pin or projection $w'$ and the stop $x'$. The long arm of the spring with its slightly-bent end $a^7$ is now placed under the pivotal pin $y'$, as shown in Fig. 2, and the short bend $a^7$ in the end of the wire over the pin $w'$, as shown in dotted lines in Fig. 3, the end of the wire striking the stop $x'$ formed on the lever I′, which latter is thrown back and rests on the incline $u''$. When the wire is in this position, the lever is brought forward, or in direction of the arrow, thereby bending the end of the wire over, and thus forming the loop $a^8$ (shown in Fig. 6) for locking the springs together. The wire is then removed from the pivot, the loop thus formed partially inserted in a recess, $w'$, formed in the bracket $t'$, (shown in Fig. 4,) and extends back into the block $s'$, and the lever again brought forward and forced down thereon, thus forcing the loop together.

To the side of the post B is secured the projecting wooden portion K′, to the lower portion of which is screwed the piece L′, cut away, as shown at $z'$.

To the outer end of the piece K′ is secured the lever M′, the pivot N′ of which extends beyond the side of the lever, which latter is provided with a pin or projection, O′. To the wooden portion K′ is also secured the block P′, provided on one end with a cap, $a^2$, the latter forming a recess, $a^3$, between the block P′ and itself. This block is preferably held in position by means of a screw, $b^2$, passing through an elongated slot, $b^3$, formed in the block P′ thereby allowing it to be adjusted toward or away from the lever M′. Into the recess $a^3$ is inserted the loop on the end of the long arm of the spring, and the wire then passed under the pivot N′ and over the pin O′, as shown in Fig. 2. The lever M′ is now brought over, bending the longer arm, and forming the elbow therein, as shown at the left side of Fig. 6 in the drawings.

On the upper face of the block $s'$ is secured the iron block Q′, preferably of the shape shown, having a recess, $c^2$, formed therein, into which is inserted the upper end of the wire, and the wire then bent around the round portion $c^3$ of the block Q', thus bending in the upper arm of the spring.

Springs for the foot portion of the bed are formed as follows: The lower locking portion thereof is constructed as before described, and the upper long arm thereof is cut somewhat shorter than in the springs, as above described. The locking-loop on the end thereof is formed by inserting the end of the wire in one of the holes $c^3$, formed of different sizes in the top of the block Q', and giving it a short bend. The end is then bent over, forming the locking-loop, as hereinbefore described.

The operation of making a spring is as follows: One end of the wire is first bent at right angles by the lever V, and the bent end inserted in the opening $z$ of the winder. The wire is then coiled around the winder, and the coiled spring thus formed severed from the wire strip. The lower end of the spring is then bent to the position shown in Fig. 6, as previously described, after which the upper end of the wire is fashioned.

My invention is exceedingly simple in construction, is durable and efficient in use, and can be manufactured at a small initial cost.

Having fully described my invention, what I claim as new, and desire to secure by Letters Patent, is—

1. The combination, with a winder having a hole formed in the outer end thereof and a winder-shaft, the latter provided with a serrated disk, of a crank secured to said shaft and provided with ribs adapted to enter one or more of the serrations in the disk and a stop located in the path of the handle, substantially as set forth.

2. In a machine for coiling wire springs, the combination, with a standard or support, of a winder secured thereto and a lever secured to a wooden block provided with a shoulder, said lever being provided with a box or holding device for the reception and bending of the end of the wire, substantially as set forth.

3. In a machine for making coiled springs, the combination, with a base, a standard rigidly secured to said base, and a winder journaled in said standard, of a post or standard hinged to the base and provided at its upper end with a wire-cutting device and mechanism for adjusting the upper end of said hinged standard toward and away from the rigid standard.

4. In a machine for making coiled springs, the combination, with a base, a standard secured thereto, and a winder journaled in said standard, of a second standard secured to the base, a cutter, and a spring-pressed wire-holder secured to said second standard, and a lever and pitman for operating the cutter, substantially as set forth.

5. In a machine for making coiled springs, the combination, with a base, a standard rigidly secured thereto, and a winder journaled in the upper end of said standard, of a standard hinged to the base and provided at its upper end with a wire-cutter and a wire-holder and mechanism for adjusting the upper end of the hinged standard toward and away from the rigid standard, substantially as set forth.

6. In a machine for making coiled springs, the combination, with a base, a rigid standard, and a winder journaled therein, of a standard hinged to the base, devices for adjusting the upper end of said standard toward and away from the rigid standard, a wire-cutter secured to the upper end of the movable standard, a lever pivotally secured to the lower end of the movable standard, and a pitman connecting the lever and cutter, substantially as set forth.

7. The combination, with a post or standard, of a winder secured thereto, a movable standard provided with cutters, stationary and spring-actuated grasping and holding jaws secured to the movable standard, and means for simultaneously operating the cutters and said grasping and holding jaws, substantially as set forth.

8. The combination, with a post or standard, of a winder secured thereto, a movable standard provided with cutters operated by a pitman and lever, a stationary and a spring-actuated jaw secured to the movable standard, and a trigger resting against the spring-actuated jaw and operated by said pitman, substantially as set forth.

9. The combination, with a standard or support, of a winder secured thereto, and a lever pivotally secured at its lower end to a base or other convenient support and provided at its upper end with a handle, said lever being adapted to compress the spring between itself and a wooden block secured to the standard, substantially as set forth.

10. The combination, with a standard or support, of a winder secured thereto, a tension-lever pivoted at one end to the standard and connected with a spring-actuated lever, said bar being adapted to bear on the wire as it is being coiled, substantially as set forth.

11. In a machine for coiling wire springs, a standard supporting a winder and having an adjustable table secured thereto, a horizontal bar, D', projecting from the back of the table and provided near its end with a transverse groove and on its side with a pivoted stop, said bar being adapted to hold the wire while it is being bent, substantially as set forth.

12. In a machine for making springs, an adjustable table secured to a standard or other support, a metal bar projecting from the back of the table and provided with a transverse groove and on its side with a pivoted stop, the back of the table being also provided with a larger stop in line with said bar, substantially as and for the purpose described.

13. In a machine for making wire springs, the combination, with a standard supporting a winder, of an adjustable table secured to the standard, a flat metallic plate secured to the back of the table and provided with a series of different-sized recesses for bending the end of the wire, and a lever connected to the standard and adapted to form a loop on the bent end of said wire, substantially as set forth.

14. In a machine for making bed-springs, the combination of the following instrumentalities, to wit: a winder for coiling or winding the spring, a cutter for severing the coiled spring from the main body of the wire, and a lever pivoted on a pin projecting out beyond the lever and provided with a projection and stop formed integral therewith for bending the upper end of the spring, substantially as set forth.

15. In a machine for making coiled springs, the combination, with a standard and a winder journaled therein, of the plate Q', secured on the top of said standard, and provided with a slot, a series of holes, and a rounded bearing-surface, substantially as set forth.

In testimony whereof I have signed this specification in the presence of two subscribing witnesses.

EDGAR A. JONES.

Witnesses:
ALBERT C. TITUS,
A. W. SNYDER.